Sept. 13, 1932.  I. Z. ZELMA  1,877,712
ANIMAL TRAP
Filed Oct. 30, 1929  2 Sheets-Sheet 1
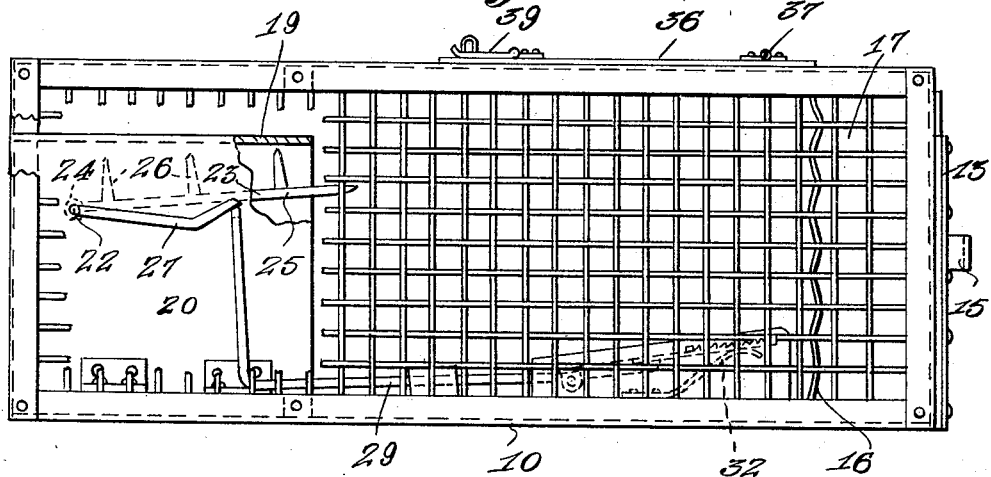
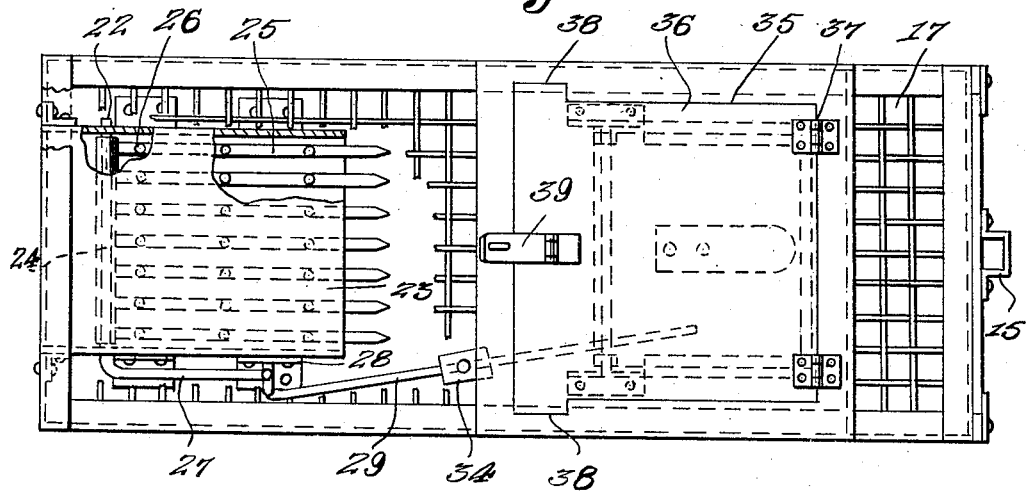
I. Z. Zelma,
INVENTOR
BY Victor J. Evans
ATTORNEY Sept. 13, 1932.     I. Z. ZELMA     1,877,712
ANIMAL TRAP
Filed Oct. 30, 1929     2 Sheets-Sheet 2
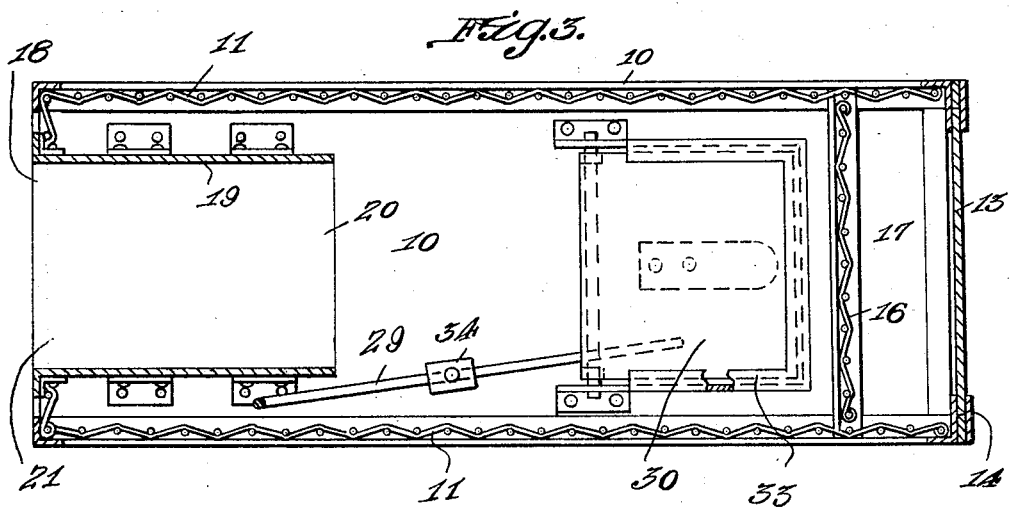
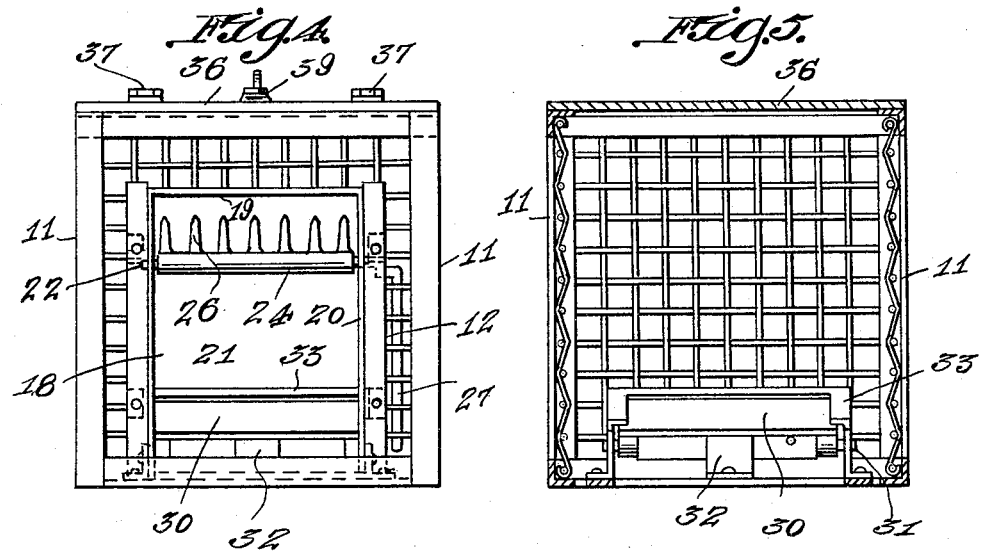
I. Z. Zelma,
INVENTOR
BY Victor J. Evans
ATTORNEY Patented Sept. 13, 1932

1,877,712

UNITED STATES PATENT OFFICE

ISAIAH Z. ZELMA, OF FLORENCE, ALABAMA, ASSIGNOR OF ONE-HALF TO ALFRED H. GRABOW, OF FRANKLIN SQUARE, LONG ISLAND, NEW YORK

ANIMAL TRAP

Application filed October 30, 1929. Serial No. 403,552.

This invention relates to animal traps and has for an object the provision of a trap by means of which animals may be captured in a humane manner and without injury to the fur.

Another object of the invention is the provision of a trap which may use either dead or live bait, with the bait so protected that it can not be reached by the animal, the bait thus remaining uninjured so that it may be used for a relatively long period.

Another object of the invention is to provide means for housing the bait, which in addition to protecting the bait from injury by the animal, provides means whereby live bait may be cared for and kept in condition for a long time.

Another object of the invention is the provision of a trap which will operate to prevent the escape of a captured animal, and permit of the capture of additional animals attracted by the bait and by the captured animal.

With the above and other objects in view, the invention further includes the following novel features and details of construction, to be hereinafter more fully described, illustrated in the accompanying drawings and pointed out in the appended claim.

In the drawings:—

Figure 1 is a side elevation of a trap constructed in accordance with the invention, parts being broken away.

Figure 2 is a top plan view with parts broken away.

Figure 3 is a horizontal sectional view.

Figure 4 is a front view.

Figure 5 is a transverse section.

Referring to the drawings in detail wherein like characters of reference denote corresponding parts, the trap 1 is formed of a cage-like structure comprising a base or bottom 10 which may be made of wood, metal or other suitable material and which has rising therefrom side walls 11, a front wall 12, and a rear wall 13. This rear wall is slidingly mounted within oppositely disposed guides 14 and provides a door whereby access may be had to the interior of the trap through its rear end.

A handle 15 is provided to facilitate operation of the door.

A partition 16 extends transversely of the trap and is spaced from the rear wall or door 13, and this partition co-operates with the rear and side walls to provide a bait compartment 17. Either dead or live bait may be placed within this compartment, and as the side walls 11 and partition 16 are formed of foraminous material, the bait may be readily seen. However, the rear wall or door 13 is solid so that the bait may not be seen from the rear of the trap.

The front wall 12 of the trap is provided with an entrance opening 18 and extending into the trap from this opening are imperforate top and side walls 19 and 20 respectively which define a passage or vestibule 21, through which the animal may enter the trap.

Pivotally mounted as shown at 22 at the top of the vestibule or passage 21 is a door or gate 23. This door or gate comprises a bar 24 from which extends bars 25, the latter being disposed at right angles to the bar 24 and carrying pointed studs 26. The bars 25 are also pointed, and when the door or gate is closed, these pointed ends will rest upon the bottom of the trap with the studs 26 extending inward, so that an animal attempting to escape will be resisted by these studs. However, an animal may readily enter the trap even though the door is closed, as its manner of opening will permit of entrance but prevent exit.

The bar 24 has extending therefrom an arm 27 which is adapted to be engaged by the angularly disposed end 28 of a trigger rod or bar 29. This trigger rod or bar 29 has one of its ends secured to a pivotally mounted treadle or platform 30, the latter being mounted for pivotal movement as shown at 31 and having one of its ends evenly held in raised position by means of the spring 32. It will be apparent that the pressure exerted by the weight of an animal upon the pivoted platform will cause the trigger 29 to be disengaged from the arm 27 and permit the door or gate to fall to a closed position.

The opposite sides and one end of the platform 30 are enclosed by flange 33 which acts to keep snow and other extraneous matter from beneath the platform so that its operation will not be interfered with.

Slidingly and adjustably mounted upon the trigger 29 is a weight 34. This weight may be adjusted in accordance with the character and weight of an animal to be captured.

The top of the trap is provided with an opening 35 which is normally closed by lid 36 and this lid is hingedly mounted as shown at 37 and is provided with oppositely extending lugs 38. The lugs 38 engage the top of the trap and limit downward movement of the lid. A hasp 39 may be provided to lock the lid in closed position and prevent the escape of a captured animal.

The invention is susceptible of various changes in its form, proportions and minor details of construction and the right is herein reserved to make such changes as properly fall within the scope of the appended claim.

Having described the invention what is claimed is:—

An animal trap comprising a foraminous cage having each end open, a solid door closing one end of the cage, a foraminous partition in the cage adjacent the door to provide a bait compartment separated from the remaining portion of the cage, an open end vestibule having solid walls extending inwardly of the cage from the other end thereof, a spiked gate pivoted in said vestibule and including a plurality of relatively spaced and pointed bars, an arm on said gate, a spring supported and pivotally mounted treadle in the cage adjacent the partition and spaced from and in alignment with the vestibule, and a trip member connected to the treadle and engaging the arm to hold the gate in an open position.

In testimony whereof I affix my signature.

ISAIAH Z. ZELMA.